(12) United States Patent
Arquero et al.

(10) Patent No.: US 11,301,648 B2
(45) Date of Patent: Apr. 12, 2022

(54) SMART TRAIN (71) Applicant: INTERNATIONAL BUSINESS MACHINES CORPORATION, Armonk, NY (US)

(72) Inventors: Gregg M. Arquero, White Plains, NY (US); Eli M. Dow, Wappingers Falls, NY (US); Syed F. Hossain, Wappingers Falls, NY (US); Joshua Schaeffer, White Plains, NY (US); Yunli Tang, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 15/885,928

(22) Filed: Feb. 1, 2018

(65) Prior Publication Data
US 2019/0236322 A1 Aug. 1, 2019

(51) Int. Cl.
G06K 7/10 (2006.01)
G06Q 10/02 (2012.01)
(Continued)

(52) U.S. Cl.
CPC ......... G06K 7/10297 (2013.01); B61D 41/04 (2013.01); B61L 15/0018 (2013.01);
(Continued)

(58) Field of Classification Search
CPC ........... G06K 7/10297; G06K 7/10366; G06K 2007/10504; B61D 41/04; B61D 41/00;
(Continued)

(56) References Cited

U.S. PATENT DOCUMENTS 9,352,756 B2 5/2016 Grant
10,366,373 B1* 7/2019 Denker .............. G06Q 10/0635
(Continued)

FOREIGN PATENT DOCUMENTS

DE 202011110004 U1 8/2012
EP 0757948 A1 2/1997
(Continued)

OTHER PUBLICATIONS

"SmarTrip® Q&A", Jan. 12, 2018, https://web.archive.org/web/20180112044848/https://www.wmata.com/fares/smartrip/faq.cfm/ (Year: 2018).*
(Continued)

Primary Examiner — George Chen
Assistant Examiner — Ismail A Manejwala
(74) Attorney, Agent, or Firm — Robert D. Bean (57) ABSTRACT According to one embodiment, a method, computer system, and computer program product for tracking occupancy on a transit system is provided. The present invention may include receiving passenger information for passengers boarding a public transit system comprising one or more cars; counting the passengers within each of the cars of the public transit system based on the location of each of the passengers; identifying, based on the location of each of the passengers, whether each of the passengers is seated or standing; and displaying, based on the counting and identifying of the passengers, the current occupancy of each of the cars.

17 Claims, 5 Drawing Sheets (51) Int. Cl.
*B61L 15/00* (2006.01)
*B61D 41/04* (2006.01)

(52) U.S. Cl.
CPC ...... *B61L 15/0072* (2013.01); *G06K 7/10366* (2013.01); *G06Q 10/02* (2013.01); *G06K 2007/10504* (2013.01)

(58) Field of Classification Search
CPC ............ B61L 15/0018; B61L 15/0072; B61L 15/009; B61L 15/0045; G06Q 10/02; G06Q 30/06; G06Q 50/30; Y02T 30/00; G07C 9/00; G07B 15/00
See application file for complete search history.

(56) References Cited

U.S. PATENT DOCUMENTS

| | | | | |
|---|---|---|---|---|
| 10,496,365 | B2 * | 12/2019 | Tanabe | G10L 25/51 |
| 2004/0070496 | A1 * | 4/2004 | Kirschner | H04R 27/00 |
| | | | | 340/506 |
| 2006/0037818 | A1 * | 2/2006 | Deplazes | B66B 1/3476 |
| | | | | 187/392 |
| 2007/0214258 | A1 | 9/2007 | Karrapanan et al. | |
| 2011/0082714 | A1 * | 4/2011 | Gaikwad | G06Q 10/02 |
| | | | | 705/5 |
| 2013/0231965 | A1 * | 9/2013 | Tokatly | G06Q 10/02 |
| | | | | 705/5 |
| 2014/0125355 | A1 * | 5/2014 | Grant | B64D 11/062 |
| | | | | 324/629 |
| 2014/0357261 | A1 * | 12/2014 | Chiu | H04W 4/027 |
| | | | | 455/426.1 |
| 2015/0330787 | A1 * | 11/2015 | Cioffi | G01C 21/00 |
| | | | | 701/537 |
| 2017/0286761 | A1 * | 10/2017 | Zackay | G06K 9/00771 |

FOREIGN PATENT DOCUMENTS

| | | |
|---|---|---|
| JP | 2004038418 A | 2/2004 |
| WO | WO-2018215658 A1 * | 11/2018 ............. G06Q 10/02 |

OTHER PUBLICATIONS

Bus Detection System for Blind People using RFID, Jalila Al Kalbani, Feb. 2015, IEEE (Year: 2015).*

Mell et al., "The NIST Definition of Cloud Computing," National Institute of Standards and Technology, Sep. 2011, p. 1-3, Special Publication 800-145.

Anonymous, "Smart Seat Reservation system", An IP.com Prior Art Database Technical Disclosure, Original Publication Date: May 11, 2004, IP.com No. IPCOM000028347D, IP.com Electronic Publication Date: May 11, 2004, pp. 1-4.

Solon, "Train app lets customers see how busy carriages are before boarding", Wired UK, Realtime Analytics, Feb. 18, 2013, http://www.wired.co.uk/article/train-crowds-app, pp. 1-3.

* cited by examiner

SMART TRAIN

BACKGROUND

The present invention relates, generally, to the field of computing, and more particularly to smart transit.

Smart transit is the field relating to the marriage of traditional forms of transit, such as light rail, regional rail, subways, and cars, with computing technology in order to better automate the system, increase safety and efficiency, and improve the passenger experience, among others. A colorful example of a recent advance in smart transit technology involves a three-car train that runs on a regular roadway and uses sensors to align the train to stripes painted on to the road. In less colorful examples, trains and track systems have been equipped with sensors to allow operators to gather telemetry on train locations to improve scheduling and better avoid accidents. Smart transit has the capacity to revolutionize transit and realize incredible improvements to the commutes of passengers.

SUMMARY

According to one embodiment, a method, computer system, and computer program product for tracking occupancy on a transit system is provided. The present invention may include receiving passenger information for passengers boarding a public transit system comprising one or more cars; counting the passengers within each of the cars of the public transit system based on the location of each of the passengers; identifying, based on the location of each of the passengers, whether each of the passengers is seated or standing; and displaying, based on the counting and identifying of the passengers, the current occupancy of each of the cars.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to smart transit. The following described exemplary embodiments provide a system, method, and program product to, among other things, utilize radio-frequency identification to track the occupancy of cars within a transit system and tailor announcements, passenger notifications, car and seat occupancy, and other factors according to occupancy data. Therefore, the present embodiment has the capacity to improve the technical field of smart transit by vastly improving the passenger experience, such as by making announcements that are more relevant to passengers in a given car, providing car and seat occupancy data to passengers to streamline the boarding process, allowing passengers to organically reserve seats that they have chosen, alerting passengers when the train they have boarded will not stop at the destination on their ticket, and alerting conductors when passengers have missed their stop.

As previously described, smart transit is the field relating to the marriage of traditional forms of transit, such as light rail, regional rail, subways, and cars, with computing technology in order to better automate the system, increase safety and efficiency, and improve the passenger experience, among others. A colorful example of a recent advance in smart transit technology involves a three-car train that runs on a regular roadway and uses sensors to align the train to stripes painted on to the road. In less colorful examples, trains and track systems have been equipped with sensors to allow operators to gather telemetry on train locations to improve scheduling and better avoid accidents. Kiosks have been linked to smartphones to allow cardless payment. Smart transit has the capacity to revolutionize transit and realize incredible improvements to the commutes of passengers.

Transit systems have been increasingly augmented with various smart systems to improve the rider's experience. However, the average rider's experience still contains countless hassles and inconveniences; for instance, since there is no way for a passenger to assess how crowded an individual car may be from the platform, passengers may find themselves in a car that is already full, even though the train may contain nearly-empty cars. Furthermore, announcements are not tailored to the destination of the passengers in the car, thereby ensuring that many announcements will not be relevant to passengers within that car, encouraging them to tune out and increasing the likelihood of missing important announcements. Additionally, passengers may stay on a train beyond their stop by accident, or may board a train heading to the wrong destination. Passengers may take the seats of other passengers by accident, or have their seats taken while they are in the bathroom. Problems exist for train operators, as well; passengers may stay on a train beyond their destination, or may be overlooked by a conductor and may ride without paying. These problems have not yet been addressed in any serious way. Furthermore, there has been no real effort to utilize a valuable untapped resource with the potential to solve these problems; the abundance of train ticket information gathered by online ticket vendors and station ticket windows, which could realize massive improvements to a passenger's transit experience if tapped through data analysis and acted upon. As such, it may be advantageous to, among other things, implement a system that uses ticket data and RFID tags within tickets to track the occupants of train cars in order to tailor announcements on a per-car basis, ensure passengers are on the correct train and get off at the correct stop to reach their destination, allow dynamic reservation of seats, display per-car occupancy information to prospective passengers to streamline boarding, and other such benefits.

According to one embodiment, the invention is a means of tracking occupancy of cars on a multi-car urban transit system using ticket information and RFID tags embedded in tickets. The location of passengers within a train car is used to count the number of occupied seats and reserve seats for riders while they occupy the car. The number of occupied seats in the car is displayed on screens accessible to passengers outside the train, in order to streamline the boarding process. The ticket information (namely destination) is used to modify announcements within the car to remove any that are not relevant to any passenger within the car based on the destinations of each occupant of the car. The information is also used to flag passengers who have boarded the wrong train or missed their stop, so that either a notification can be sent to that passenger's phone, an announcement can be made, or a conductor can be notified.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize radio-frequency identification to track the occupancy of cars within a transit system and tailor announcements, passenger notifications, car and seat occupancy, and other factors according to occupancy data.

Figure 1:
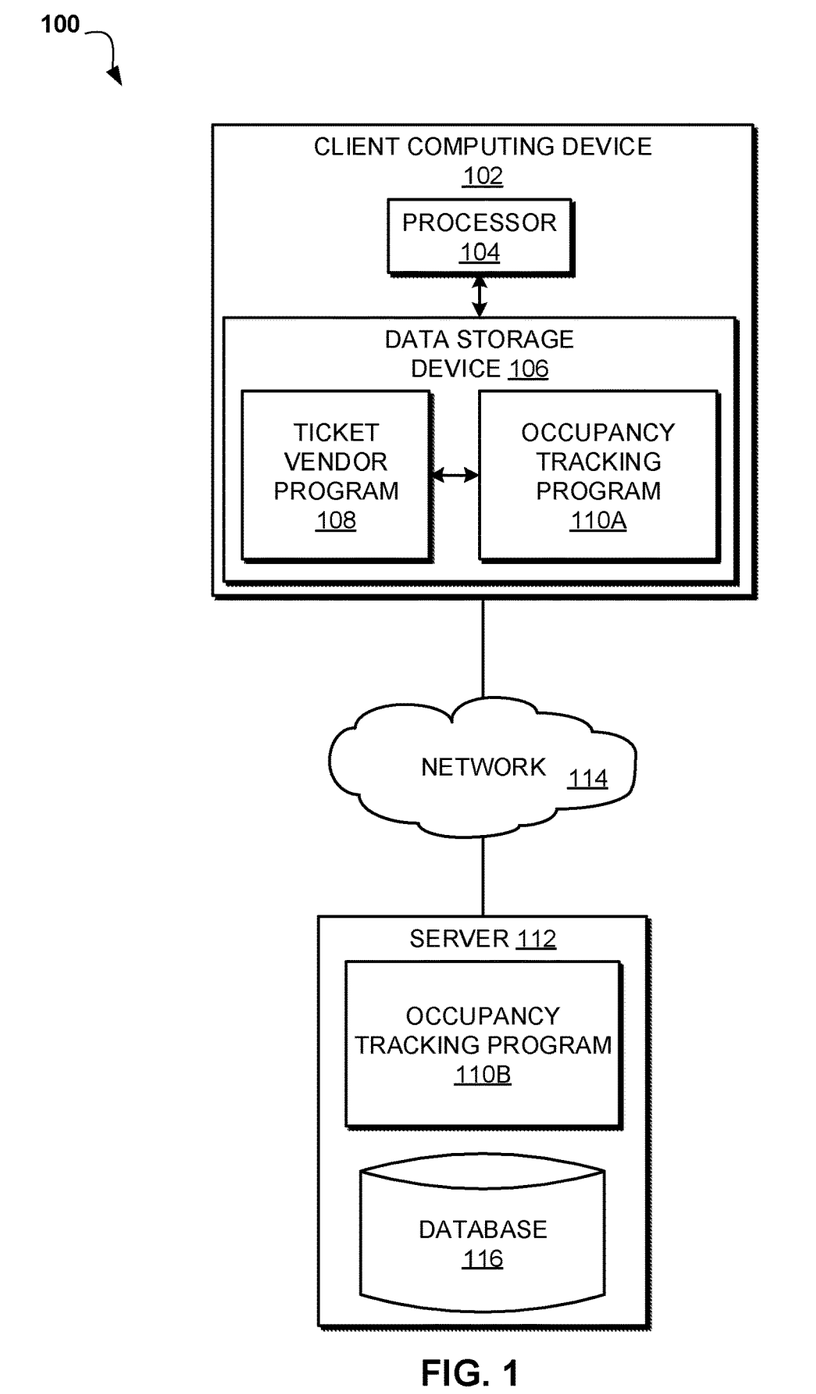
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a ticket vendor program 108 and an occupancy tracking program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. Client computing device may also be integrated with the electrical or computing systems within a transit system, such as a locomotive, automobile or rail car. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an occupancy tracking program 110B and a database 116 and communicating with the client computing device 102 via the communication network 114, in accordance with embodiments of the invention. Server 112 may be part of the computing network of a station or transit hub. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Ticket vendor program 108 may be any software program capable of selling transit tickets or rides to prospective passengers, either remotely over the internet or at kiosks or windows disposed within a station or transit hub or otherwise accessible to prospective passengers, including on the transit system itself. Ticket vendor program 108 may collect and store passenger information including the destination and name of the passenger, as well as other ridership data such as frequency of travel, distance traveled, number of trips, destinations, et cetera. Tickets sold or interacted with by ticket vendor program 108 may include devices, such as RFID chips or similar, to allow the tickets to be located, matched with a particular passenger via a unique identifier, and tracked by sensors. The tickets may be disposable or reusable. In some embodiments, the ticket may be a mobile device such as a tablet or cell phone upon which a software program has been installed allowing the mobile device's location to be wirelessly tracked within a transit system and allowing the mobile device to be matched with a passenger via a unique identifier. In such embodiments, the mobile device may further be capable of storing passenger information and communicating passenger information to occupancy tracking program 110A, 110B upon request. Ticket vendor program 108 may be run on client computing device 102 or server 112, and may be in communication with occupancy tracking program 110A, 110B or may store passenger information in a repository, such as database 116 or data storage device 106, which is in communication with occupancy tracking program 110A, 110B.

According to the present embodiment, the occupancy tracking program 110A, 110B may be a program capable of utilizing radio-frequency identification to track the occupancy of cars within a transit system and tailor announcements, passenger notifications, car and seat occupancy, and other factors according to occupancy data. The occupancy tracking program 110A, 110B may be in communication with sensors disposed throughout a transit system, such as a train, bus, subway, etc., which may include radio-frequency identification (RFID) sensors. The occupancy tracking program 110A, 110B may additionally be in communication with a wireless transceiver capable of communicating remotely with a mobile device, and may be in communication with a public address system or with a program configured to make announcements over a public address system. The occupancy tracking program 110A, 110B may also receive passenger data directly from ticket vendor program 108, or from a data repository such as database 116. The smart occupancy tracking method is explained in further detail below with respect to FIG. 2.

Figure 2:
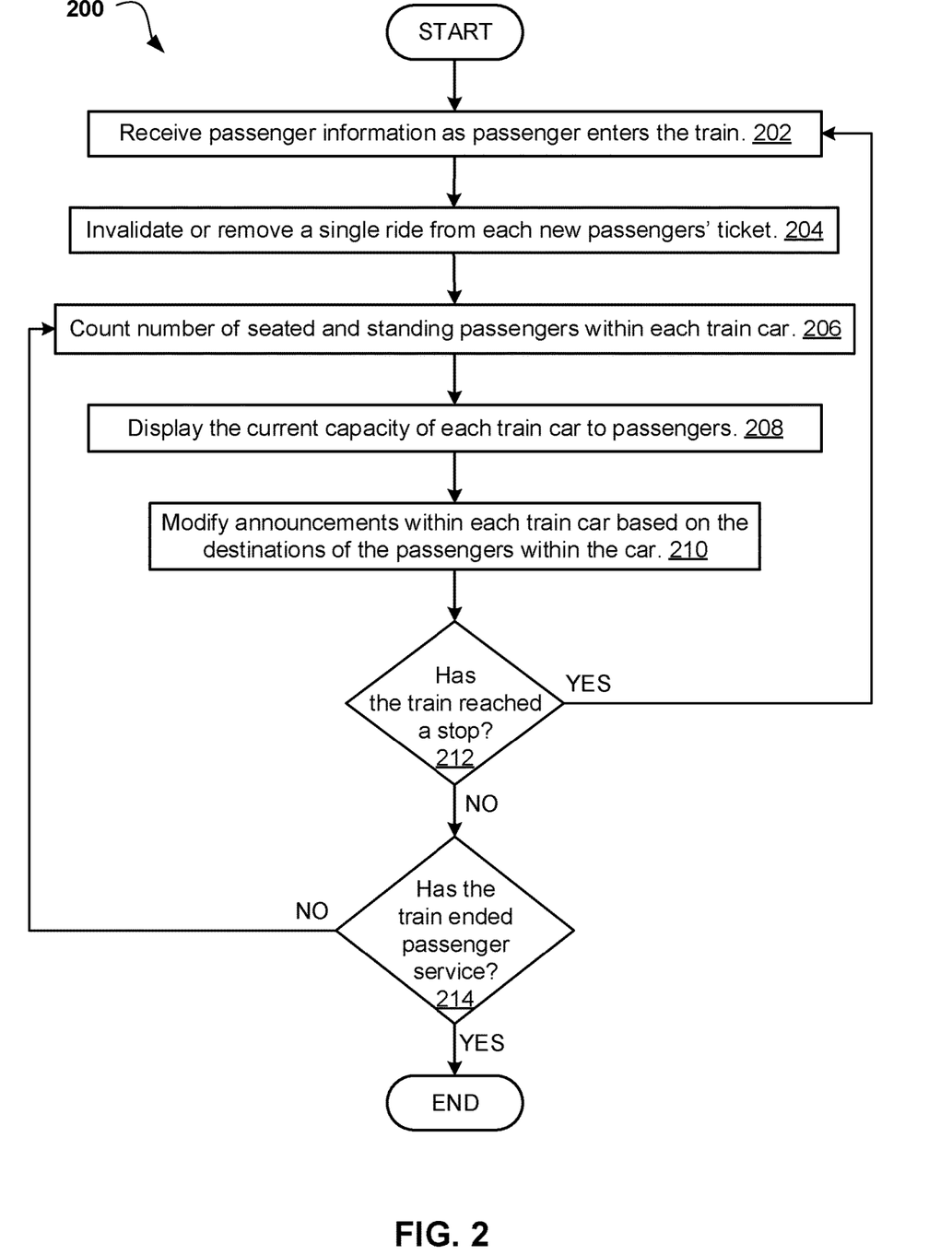
FIG. 2 is an operational flowchart illustrating a smart occupancy tracking process according to at least one embodiment.

Referring now to FIG. 2, an operational flowchart illustrating an occupancy tracking process 200 is depicted according to at least one embodiment. At 202, the occupancy tracking program 110A, 110B receives passenger information as each passenger enters the train. The occupancy tracking program 110A, 110B may receive passenger information by scanning the ticket borne by each passenger to receive a unique identifier, and may then search for information associated with the unique identifier in a data repository such as data storage device 106 or database 116. In another embodiment, occupancy tracking program 110A, 110B may request information from an entity based on the unique identifier, such as ticket vendor program 108. In other embodiments, passenger information may be encoded on the ticket itself. If passenger information cannot be obtained on a given passenger, such as in the event of a missing or malfunctioning ticket, occupancy tracking program 110A, 110B may alert a conductor or other human operator to the presence or location of the passenger. In situations where ticket sales are conducted on the train, occupancy tracking program 110A, 110B may receive updated passenger information from a conductor.

Next, at 204, the occupancy tracking program 110A, 110B invalidates or removes a single ride from each new passengers' ticket. The occupancy tracking program 110A, 110B may invalidate or remove a ride by modifying passenger information in a data repository, such as data storage device 106 or database 116, or may communicate the request to an entity managing the passenger information, such as ticket vendor program 108. In embodiments where passenger information is encoded on the ticket, occupancy tracking program 110A, 110B may communicate the change request to the ticket via a wireless transmission medium. Where a passenger has insufficient rides left on a ticket for the destination, has remained on the train past her destination, or is bound for a destination that is not reached by the train she has boarded, occupancy tracking program 110A, 110B may alert a conductor to the location of the passenger and the nature of the problem. The occupancy tracking program 110A, 110B may also send a notification to the mobile device of the passenger.

Then, at 206, the occupancy tracking program 110A, 110B counts the number of seated and standing passengers within each train car. The occupancy tracking program 110A, 110B may count the number of seated and standing passengers by tracking the location of each ticket associated with a passenger via one or more sensors. The occupancy tracking program 110A, 110B may discern between seated and standing passengers by determining whether a ticket, and by extension a passenger, is within a threshold distance from a seat. To facilitate the threshold assessment, short range proximity sensors may be installed in or close to the seats to provide more precise measurements, while sensors in the aisles where no seats are located may be longer-range and less precise. In another embodiment, seats may be equipped with an interface that allows a passenger to claim the seat by, for example, pressing a button or scanning the ticket.

Next, at 208, the occupancy tracking program 110A, 110B displays the current capacity of each train car to passengers. The occupancy of a car may be displayed on a screen on the outside of that car, to allow passengers on the platform to assess the respective occupancies on each car and board the least crowded, thereby efficiently allocating passengers among the cars. The occupancy of each car may also be broadcast to kiosks at a station, or transmitted to the mobile devices of such passengers to which the information may be relevant. Occupancy may be displayed through numbers of seats available, or through more abstract representations, such as a simple rectangle representing capacity that fills relative to the number of occupants in the car. Furthermore, alternate cars with more available seating than the current car may be displayed.

Then, at 210, the occupancy tracking program 110A, 110B modifies announcements within each train car based on the destinations of the passengers within the car. The occupancy tracking program 110A, 110B may modify announcements by communicating with a program responsible for making automated announcements within each train car, or by communicating with a human operator responsible for making announcements. The occupancy tracking program 110A, 110B may modify announcements on a per-car basis by only making announcements that are relevant to the occupants of the car. For instance, if a car contains one occupant stopping at Croton Falls, and two passengers stopping at Purdys, occupancy tracking program 110A, 110B may skip or abridge an announcement when the train stops at Golden's Bridge, as no passenger within the car is disembarking at that station. Conversely, additional announcements may be made, or notifications may be sent to the mobile devices of passengers within the car, regarding upcoming stops where passengers within the car will be disembarking.

Next, at 212, the occupancy tracking program 110A, 110B determines whether the train has reached a stop. The occupancy tracking program 110A, 110B may determine that the train has reached a stop by receiving location information from a train's onboard computer, or communication from a station, or from any other source. According to one implementation, if the occupancy tracking program 110A, 110B determines that the train has reached a stop, (step 212, "YES" branch), the occupancy tracking program 110A, 110B may return to step 202 to receive passenger information as passengers enter the train. If the occupancy tracking program 110A, 110B determines that the train has not reached a stop, (step 212, "NO" branch), the occupancy tracking program 110A, 110B may continue to step 214 to determine whether the train has ended passenger service.

Then, at 214, the occupancy tracking program 110A, 110B determines whether the train has ended passenger service. The occupancy tracking program 110A, 110B may determine that a train has ended passenger service by receiving information from the train's onboard computer, input from a human operator, or any other means. According to one implementation, if the occupancy tracking program 110A, 110B determines that the train has ended passenger service, (step 212, "YES" branch), the occupancy tracking program 110A, 110B may terminate. If the occupancy tracking program 110A, 110B determines that the train has not ended passenger service, (step 212, "NO" branch), the occupancy tracking program 110A, 110B may return to step 206 to count the number of seated and standing passengers within each train car.

It may be appreciated that FIG. 2 provides only an illustration of one implementation and does not imply any limitations with regard to how different embodiments may be implemented. While the steps are ordered in a certain way for illustrative convenience, any number of the steps may be performed in any order and combination. Many modifications to the depicted environments may be made based on design and implementation requirements. For example, occupancy tracking program 110A, 110B may reserve a seat to the passenger occupying it, such that other passengers are made known, either by displays within the car, apps on a mobile device, displays on the seat itself, or some other means, that the seat is occupied. In such an embodiment, reservation of the seat would allow a passenger to leave the seat, for instance to check on luggage within the car or go to the bathroom, without the seat being tagged as unoccupied. When a seat is reserved, the occupancy of the car may be updated in real time. The reservation of the seat may be released by various means, such as if the passenger to whom the seat is reserved leaves the seat for a pre-determined amount of time, or if the passenger leaves the train car containing the reserved seat.

Furthermore, while the illustrated embodiment takes place upon a multi-car train, one skilled in the art would understand the method to apply as well to other forms of public transit, such as a multi-story vehicle where each level may be considered as a separate 'car', a vehicle containing multiple articulated segments, or even a regular bus or vehicle with a single compartment.

Figure 3:
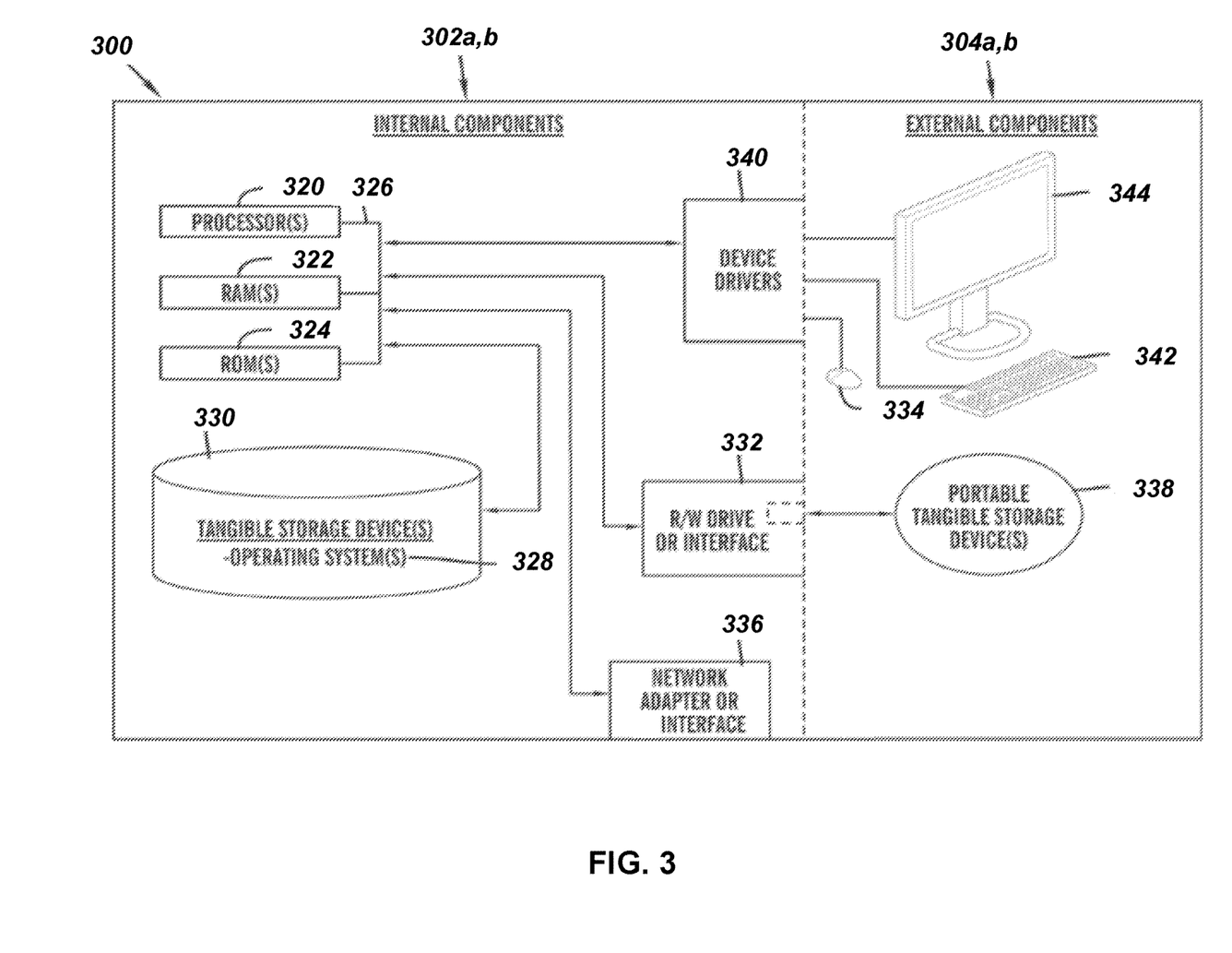
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the ticket vendor program 108 and the occupancy tracking program 110A in the client computing device 102, and the occupancy tracking program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the occupancy tracking program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The ticket vendor program 108 and the occupancy tracking program 110A in the client computing device 102 and the occupancy tracking program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the ticket vendor program 108 and the occupancy tracking program 110A in the client computing device 102 and the occupancy tracking program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
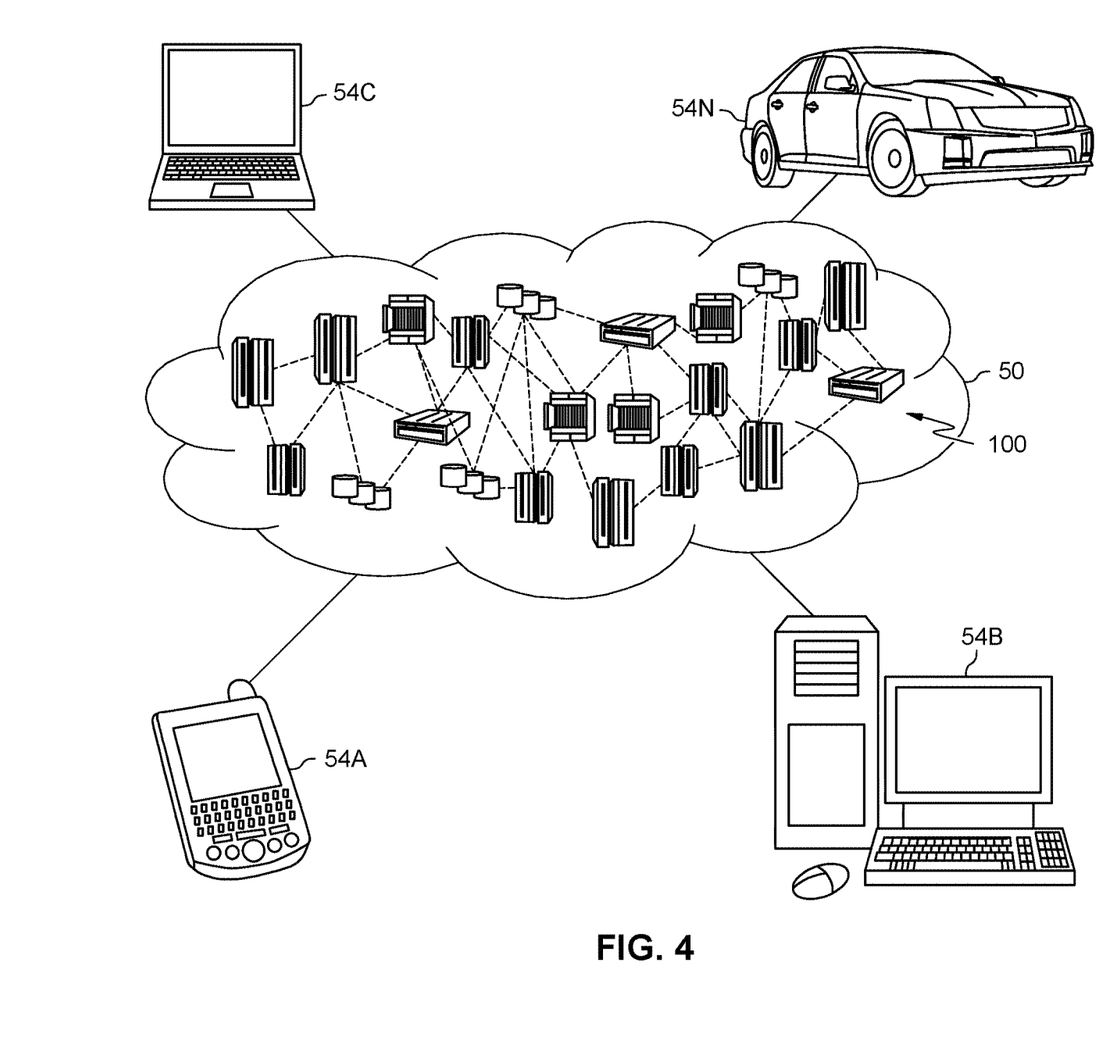
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
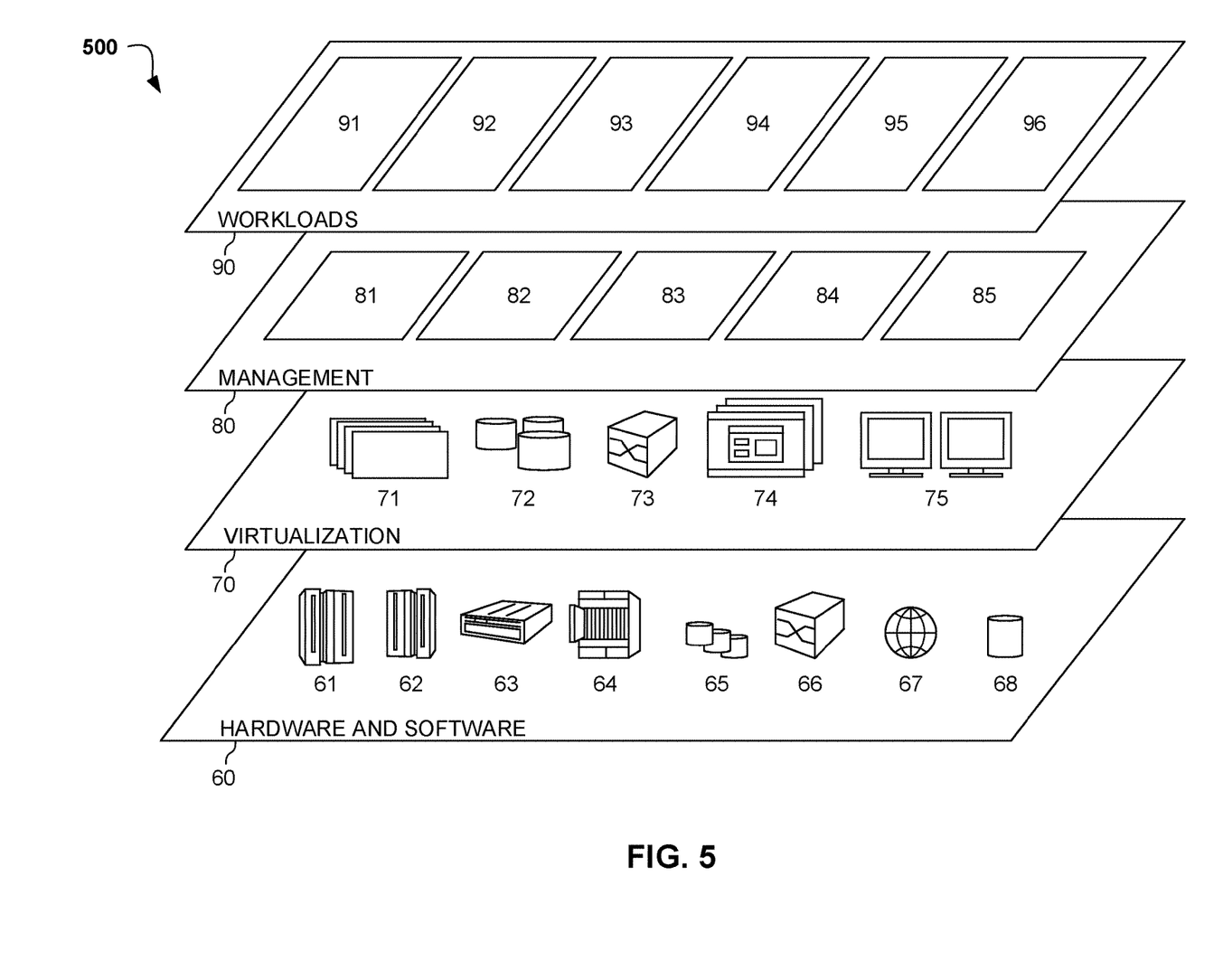
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and smart occupancy tracking 96. Occupancy tracking 96 may relate to utilizing radio-frequency identification to track the occupancy of cars within a transit system and tailor announcements, passenger notifications, car and seat occupancy, and other factors according to occupancy data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for tracking occupancy within a public transit system, the method comprising:
    receiving passenger information for a plurality of passengers boarding the public transit system comprising two or more cars;
    tracking the location, using one or more sensors, of one or more radio-frequency identification tags associated with the plurality of passengers; and
    broadcasting, based on the passenger information and the location of the radio-frequency identification tags, at least one modified announcement in at least two cars via a public address system, wherein the at least one modified announcement is an announcement modified based on the passenger information of the passengers associated with the radio-frequency identification tags within one or more cars to remove one or more stops that are not destinations of any passengers within the car of the two or more cars within which the at least one modified announcement is broadcast.

2. The method of claim 1, further comprising:
    displaying, based on the passenger information and the tracked location of the radio-frequency identification tags, a current occupancy of the two or more cars.

3. The method of claim 1, further comprising:
    modifying the passenger information of the one or more passengers upon the passenger's boarding of the transit system.

4. The method of claim 1, further comprising;
    identifying a seat within the one or more cars as reserved to a single passenger of the plurality of passengers based on the location of the radio-frequency identification tag associated with the passenger and whether the passenger is seated or standing.

5. The method of claim 1, further comprising;
    alerting, based on the passenger information associated with a passenger within the plurality of passengers is missing, incomplete, or erroneous, one or more human operators to the location of the passenger.

6. The method of claim 4, wherein the reserved seat loses a reserved status based on the radio frequency identification tag associated with a passenger leaving the car containing the reserved seat, or where the radio frequency identification tag associated with the passenger leaves the reserved seat for a time period exceeding a threshold.

7. A computer system for tracking occupancy within a public transit system, the computer system comprising:
    one or more public transit systems comprising two or more cars, one or more sensors, one or more radio-frequency identification tags, one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    receiving passenger information for a plurality of passengers boarding the public transit system comprising two or more cars;
    tracking the location, using one or more sensors, of one or more radio-frequency identification tags associated with the plurality of passengers; and
    broadcasting, based on the passenger information and the location of the radio-frequency identification tags, at least one modified-aft announcement in at least two cars via a public address system, wherein the at least one modified announcement is an announcement modified based on the passenger information of the passengers associated with the radio-frequency identification tags within one or more cars to remove one or more stops that are not destinations of any passengers within the car of the two or more cars within which the at least one modified announcement is broadcast.

8. The computer system of claim 7, further comprising:
    displaying, based on the passenger information and the tracked location of the radio-frequency identification tags, a current occupancy of the two or more cars.

9. The computer system of claim 7, further comprising:
    modifying the passenger information of the one or more passengers upon the passenger's boarding of the transit system.

10. The computer system of claim 7, further comprising;
    identifying a seat within the one or more cars as reserved to a single passenger of the plurality of passengers based on the location of the radio-frequency identification tag associated with the passenger and whether the passenger is seated or standing.

11. The computer system of claim 7, further comprising;
    alerting, based on the passenger information associated one passenger within the plurality of passengers is missing, incomplete, or erroneous, one or more human operators to the location of the passenger.

12. The computer system of claim 10, wherein the reserved seat loses a reserved status based on the radio frequency identification tag associated with a passenger leaving the car containing the reserved seat, or where the radio frequency identification tag associated with the passenger leaves the reserved seat for a time period exceeding a threshold.

13. A computer program product for tracking occupancy within a public transit system, the computer program product comprising:
    one or more computer-readable tangible storage medium and program instructions stored on at least one of the one or more tangible storage medium, the program instructions executable by a processor to cause the processor to perform a method comprising:
    receiving passenger information for a plurality of passengers boarding the public transit system comprising two or more cars;
    tracking the location, using one or more sensors, of one or more radio-frequency identification tags associated with the plurality of passengers; and
    broadcasting, based on the passenger information and the location of the radio-frequency identification tags, at least one modified announcement in at least two cars via a public address system, wherein the at least one modified announcement is an announcement modified based on the passenger information of the passengers associated with the radio-frequency identification tags within one or more cars to remove one or more stops that are not destinations of any passengers within the car of the two or more cars within which the at least one modified announcement is broadcast.

14. The computer program product of claim 13, further comprising:
displaying, based on the passenger information and the tracked location of the radio-frequency identification tags, a current occupancy of the two or more cars.

15. The computer program product of claim 13, further comprising:
modifying the passenger information of the one or more passengers upon the passenger's boarding of the transit system.

16. The computer program product of claim 13, further comprising;
identifying a seat within the one or more cars as reserved to a single passenger of the plurality of passengers based on the location of the radio-frequency identification tag associated with the passenger and whether the passenger is seated or standing.

17. The computer program product of claim 13, further comprising;
alerting, based on the passenger information associated with a passenger within the plurality of passengers is missing, incomplete, or erroneous, one or more human operators to the location of the passenger.

* * * * *